United States Patent [19]
Ohnuki et al.

[11] Patent Number: 6,074,744
[45] Date of Patent: Jun. 13, 2000

[54] LANGMUIR-BLODGETT FILMS CONTAINING TETRATHIAFULVALENE

[75] Inventors: Hitoshi Ohnuki; Mitsuru Izumi, both of Tokyo, Japan

[73] Assignee: Tokyo University of Mercantile Marine, Tokyo, Japan

[21] Appl. No.: 08/921,040

[22] Filed: Aug. 29, 1997

[30] Foreign Application Priority Data

| Mar. 11, 1997 | [JP] | Japan | 7-072802 |
| Apr. 9, 1997 | [JP] | Japan | 9-090523 |

[51] Int. Cl.[7] .............. G02F 1/1337; B32B 5/16
[52] U.S. Cl. ............ 428/333; 349/124; 428/336; 549/36; 549/39
[58] Field of Search ............ 428/333, 336; 349/124; 438/939; 530/816; 549/36, 39

[56] References Cited

U.S. PATENT DOCUMENTS

| 4,740,396 | 4/1988 | Uekita et al. | 427/434.3 |
| 4,830,952 | 5/1989 | Penner et al. | 430/287 |
| 4,900,842 | 2/1990 | Robin et al. | 549/36 |
| 4,940,516 | 7/1990 | Wegmann et al. | 204/14.1 |
| 5,102,798 | 4/1992 | Guiseppi-Ellie | 435/177 |
| 5,106,541 | 4/1992 | Singh et al. | 264/165 |
| 5,116,925 | 5/1992 | Lupo et al. | 526/323.1 |
| 5,284,779 | 2/1994 | Miyanaga | 437/1 |
| 5,688,562 | 11/1997 | Hsiung | 427/434.3 |
| 5,817,837 | 10/1998 | Muller et al. | 549/39 |

*Primary Examiner*—Hoa T. Le
*Attorney, Agent, or Firm*—Venable; Marina V. Schneller

[57] ABSTRACT

The inventive Langmuir-Blodgett film is made of an amphiphilic organic carboxylic acid, such as a long chain fatty acid, and a tetrathiafulvalene derivative having no long chain alkyl group. For example, the long chain fatty acid comprises behenic acid, and the tetrathiafulvalene derivative comprises 4,5-ethylenedioxy-4',5'-ethylenedithio-tetrathiafulvalene or bis-ethylenedioxy-tetrathiafulvalene. Such Langmuir-Blodgett film comprises uniform and well-ordered layered structure, may be readily produced and may exhibit a high electrical conductivity.

14 Claims, 9 Drawing Sheets

BEDO-TTF

FIG. 2A

EOET-TTF

FIG. 2B

BEHENIC ACID

FIG_6

FIG_7

FIG_8

FIG. 9

LANGMUIR-BLODGETT FILMS CONTAINING TETRATHIAFULVALENE

BACKGROUND OF THE INVENTION

1. Field of the Invention

The present invention relates to Langmuir-Blodgett films and a method for manufacturing the same.

2. Description of the Related Art

Prior conductive Langmuir-Blodgett films have been made of molecules each having a electroactive group and long chain alkyl group therein. Such films may be classified into the following two types: that is, charge transfer salt type and charge transfer complex type.

(1) (Charge Transfer Salt Type)

A molecule having an electroactive group and a long chain alkyl group therein [such as EDT-TTF $(SC_{18})_2$] is used to produce a Langmuir-Blodgett film. Thereafter, a secondary treatment for doping carriers is carried out, such as oxidation process using iodine vapor, to exhibit electrical conductivity.

(2) (Charge Transfer Complex Type)

A charge transfer complex is prepared consisting of an acceptor molecule (such as $C_{10}$ TCNQ) having an electroactive group and a long chain alkyl group therein and a TTF derivative molecule having no long chain alkyl group. The thus prepared complexes are then dissolved into a solvent to produce solution and developed. In this method, it is considered that the above two molecules forming each complex are bonded strongly with each other also in the solution by means of charge transfer.

SUMMARY OF THE INVENTION

Figure 1A:
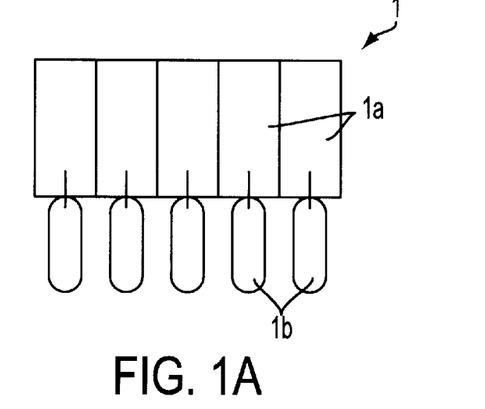
FIGS. 1(a), 1(b), and 1(c) are schematical diagrams each showing the packing structure of each prior art type Langmuir-Blodgett film.
Figure 1B:
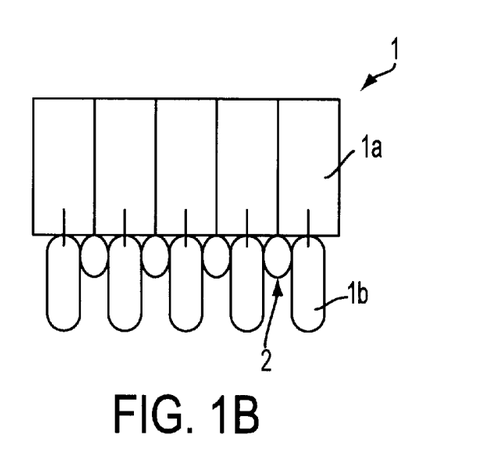

However, according to the above methods, it is rather difficult to obtain a Langmuir-Blodgett film having a high conductivity, because in-plane packing of the long chain alkyl groups determines the packing pattern of the molecules and prevents closer contact of the electroactive groups. For example, as schematically shown in FIG. 1(a), each molecule 1 comprises the long chain alkyl group 1a and the electroactive group 1b. When the alkyl groups 1a and the electroactive groups 1b of the molecules 1 are aligned in line, in-plane packing of the alkyl groups 1a determines the packing pattern of the molecules 1. Therefore, the in-plane packing of the alkyl groups 1a prevents closer contact of adjacent electroactive groups 1b. Consequently, it has been difficult to improve the conductivity of the film. When the secondary treatment, such as the oxidation process using iodine vapor, is carried out to provide electrical conductivity, anions 2 are interposed between the electroactive groups 1b to degrade the structural pattern of the film, as shown in FIG. 1(b).

Figure 1C:
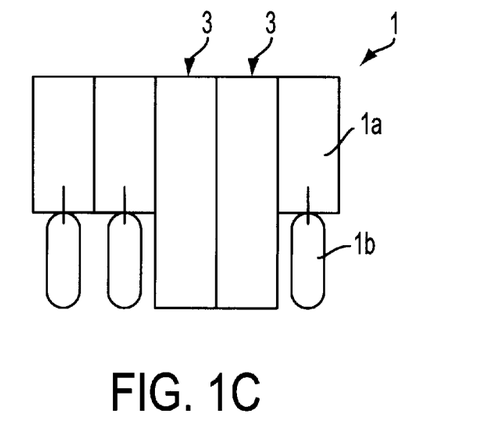

Moreover, addition of a long chain fatty acid is frequently required for adjusting the balance between the intensities of hydrophilic groups and hydrophobic groups and for producing a stable Langmuir-Blodgett film. However, in this case, as schematically shown in FIG. 1(c), the long chain fatty acids 3 are interposed to form insulating clusters. The thus obtained film comprises conductive cluster portions and insulating cluster portions. Consequently, even if the electrical conductivity of the film at a room temperature is relatively high, its behavior of direct current electrical conductivity depending on temperatures is semiconductive.

Figure 9:
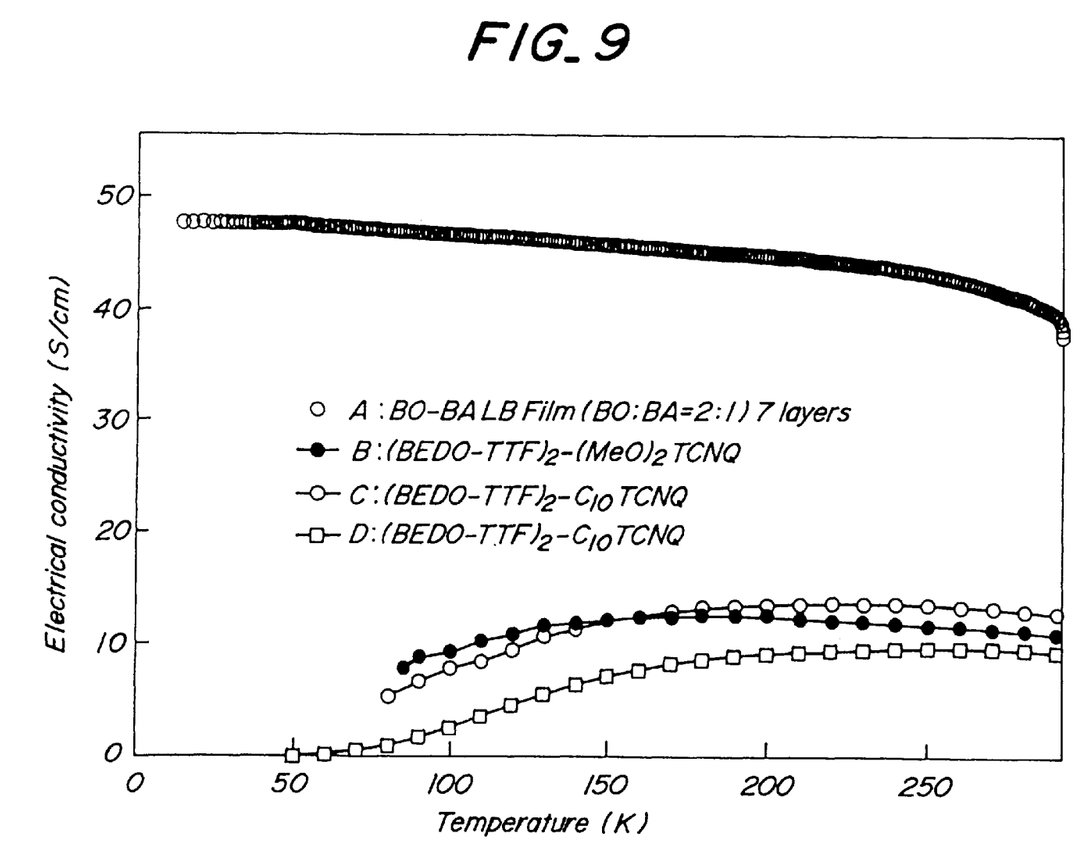
FIG. 9 shows graphs each indicating the relationship between electrical conductivities of each Langmuir-Blodgett film of the corresponding mixture system and temperatures at which the conductivities are measured.

For example, addition of a long chain fatty acid is required for producing a Langmuir-Blodgett film made of a complex of BEDO-TTF and TCNQ. However, as shown in graphs "B", "C" and "D" of FIG. 9, their electrical conductivities are rather low and its behavior is semiconductive especially below 150K, due to the insulating clusters inevitably formed in the film structure.

It is an object of the invention to provide a Langmuir-Blodgett film having uniform layered micro-structure, higher conductivity and being easily producible.

It is another object of the invention to provide a Langmuir-Blodgett film with stable and metallic electrical property even at low temperatures.

The present invention provides a Langmuir-Blodgett film made of an amphiphilic organic carboxylic acid such as a long chain fatty acid and a tetrathiafulvalene derivative having no long chain alkyl group.

The present invention also provides a manufacturing method of a Langmuir-Blodgett film comprising a step of spreading an amphiphilic organic carboxylic acid and a tetrathiafulvalene derivative having no long chain alkyl group on the surface of liquid.

Figures 2A, 2B, 2C:
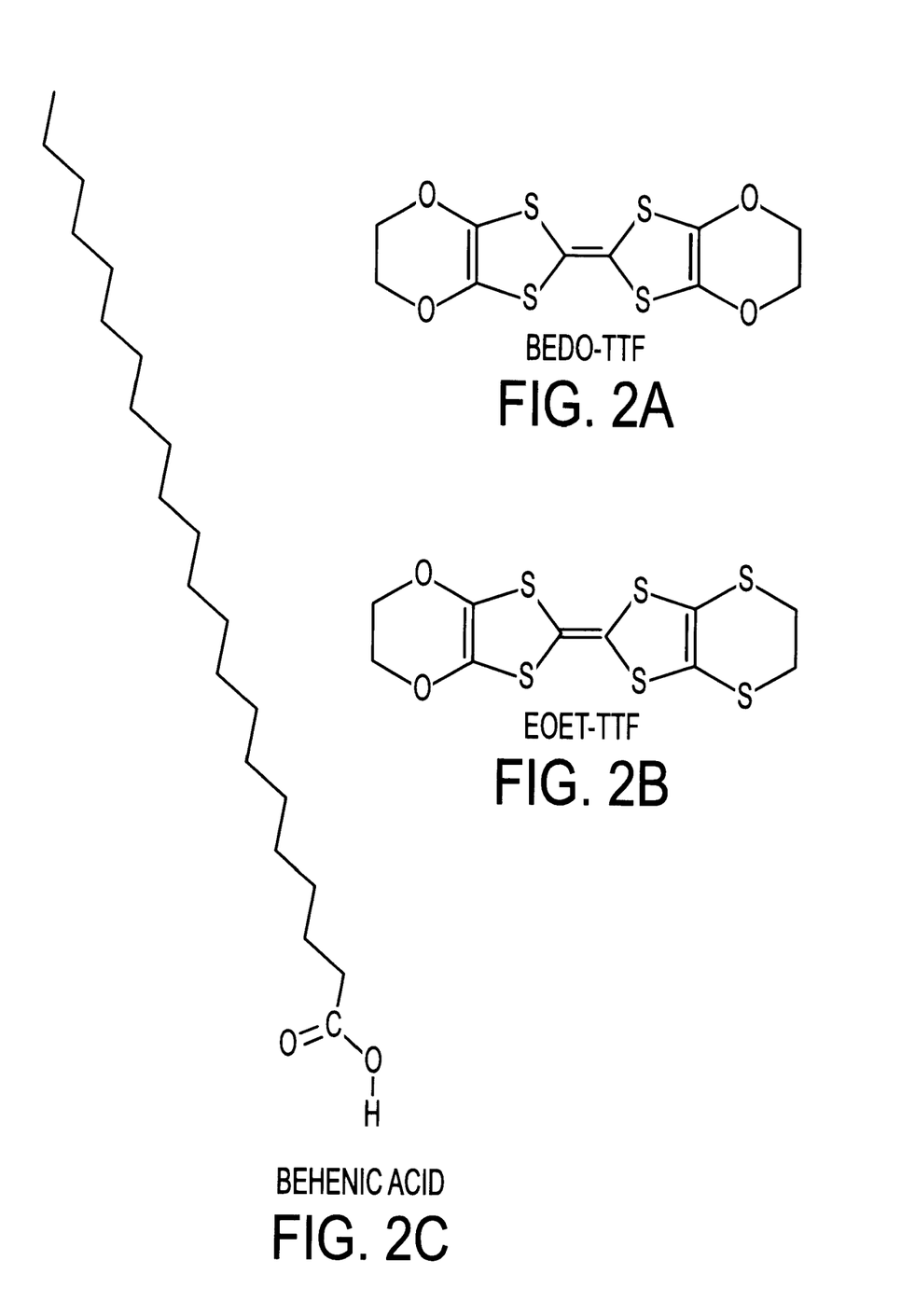
FIG. 2 shows chemical formulas of 4,5-ethylenedioxy-4', 5'-ethylenedithio-tetrathiafulvalene, bis-ethylenedioxy-tetrathiafulvalene and behenic acid.

FIG. 2 shows chemical formulas of bis-ethylenedioxy-tetrathiafulvalene (BEDO-TTF), 4,5-ethylenedioxy-4',5'-ethylenedithio-tetrathiafulvalene (EOET-TTF), and behenic acid.

The inventors developed a novel method to produce a conductive Langmuir-Blodgett film of a tetrathiafulvalene derivative. More specifically, a long chain fatty acid such as behenic acid behaves as an anion when it is spread on water surface with the tetrathiafulvalene derivative such as 4,5-ethylenedioxy-4',5'-ethylenedithio-tetrathiafulvalene or bis-ethylenedioxy-tetrathiafulvalene. Such tetrathiafulvalene derivative forms a mixed valence dimer as a result of charge transfer between it and behenic acid. The followings are the characteristics of the Langmuir-Blodgett film of the invention.

(1) Homogeneity of microstructure of the Langmuir-Blodgett film is remarkably improved, because behenic acid is not used simply as a matrix molecule.

(2) Attachment of long alkyl chains to tetrathiafulvalene derivative is not necessary, and this makes film fabrication easy to try.

Figure 3:
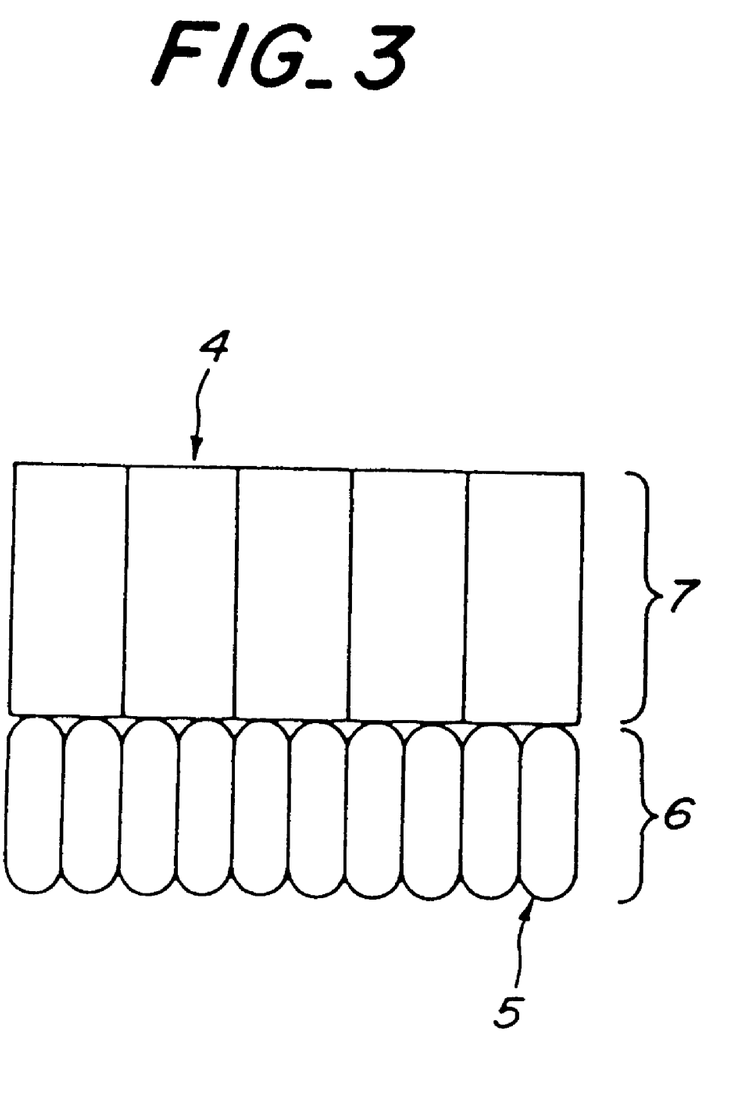
FIG. 3 is a schematical diagram showing the packing structure of the Langmuir-Blodgett film of the invention.

(3) Formation of the mixed valence dimer on the water surface is strongly expected. Behenic acid molecules form an upper layer and tetrathiafulvalene derivative molecules form a lower layer. For example, as schematically shown in FIG. 3, behenic acid molecules 4 form an upper layer 7 and tetrathiafulvalene derivative molecules 5 form a lower layer 6. Thus, on the surface of liquid on which the molecules are spread, the upper layer 7 and the lower layer 6 are separated to each other. Consequently, the upper layer 7 of behenic acid molecules 4 and the lower layer 6 of tetrathiafulvalene derivative molecules 5 are formed separately on the liquid surface, providing a solid film with double layer having uniform microstructure and thus preventing the formation of in-plane insulating clusters.

(4) Each molecule 5 within the lower layer 6 providing electrical conductivity is not bind to the adjacent behenic acid molecules to allow the molecule 5 relatively free movement. Therefore, the molecules 5 may be located closely with each other to provide two-dimensional electrical conductive path, which is considered to be a key for realizing a high electrical conductivity. It is considered that such two-dimensional electrical conductive path may provide stable and metallic conductivities even at temperatures not higher than 150 K.

When performing the invention, solution of the organic carboxylic acid such as the long chain fatty acid and solution of the tetrathiafulvalene derivative may preferably be prepared in separate containers, and then mixed to produce mixed solution, which is then spread onto the surface of liquid such as water. These two kinds of molecules are initially floated on the surface, and then compressed to provide a surface pressure. A two-dimensional solid film is formed under pressures of about 25 to 40 mN/m. The above described double-layer structure is formed during the formation of the two dimensional solid film, which is a key for providing a higher electrical conductivity.

Maintaining such state, a substrate is moved downwardly toward the film formed on the liquid surface and contacted to the film, thus providing the solid layered film thereon. Then, the substrate is moved upwardly in the liquid toward the film formed on the liquid surface and contacted to the film, thus also providing the solid layered film thereon. By repeating such procedure, two molecular layers 6 (layer "A") are laminated and then two molecular layers 7 (layer "B") are laminated sequentially on the substrate. Consequently, the molecular layers 6 and 7 (layers "A" and "B") are laminated in the order of "AABBAABBAAB-BAABB . . . " to provide a Y-type laminated film on the substrate.

The amphiphilic organic carboxylic acid may preferably be an acid which may form a stable Langmuir-Blodgett film on water surface when it is spread on the water surface alone. Because the lipophilic portion of such acid may provide stable film microstructure when the acid is spread on the water surface with the tetrathiafulvalene derivative.

A number of carbon atoms in the amphiphilic organic carboxylic acid or the long chain fatty acid may preferably be 18 to 22.

Besides, in the tetrathiafulvalene derivative, a number of carbon atoms in the "long chain alkyl group" may preferably be 8 to 24. More specifically, the tetrathiafulvalene derivative may be tetrathiafulvalene with the following one or more substitution group.

(i) 4,5-alkylenedioxy group: this substitution group is most preferable. 4',5'-alkylenedioxy group is also preferable. 4,5-ethylenedioxy group and 4',5'-ethylenedioxy group are most preferable.
(ii) 4',5'-alkylenedithio group: 4',5'-ethylenedithio group is most preferable.
(iii) 4,5-dialkyloxy substituted: these substitution groups are also preferable. 4',5'-dialkyloxy groups are also preferable. 4,5-diethoxy groups and 4',5'-diethoxys group are most preferable.
(iv) 4',5'-dialkylthio substituted: 4',5'-diethylthio groups are most preferable.

DESCRIPTION OF THE PREFERRED EMBODIMENTS

Experiment 1
(Formation of Langmuir-Blodgett Films)

Chloroform solution ($7.38 \times 10^{-4}$ mol/liter) of 4,5-ethylenedioxy-4',5'-ethylenedithio-tetrathiafulvalene (referred to as "EOET") and chloroform solution ($8.22 \times 10^{-4}$ mol/liter) of behenic acid (referred to as "BA") were prepared separately. Pure water at 2±0.1° C. was prepared. Just before spreading the solutions on the water surface, the solution was mixed with each other. Molar ratios of EOET to behenic acid were adjusted to 1:1 and 2:1, respectively, in the mixed solution.

On the water surface, the floating membrane was left in an uncompressed state for 30 minutes. After evaporating the solvent, the surface pressure vs. molecular area (Π-A) isotherms were recorded at a compression speed of $9.83 \times 10^{-3}$ $A_2 \cdot alkylchain^{-1} s^{-1}$. The same procedures were carried out in the case of mixture of bis-ethylenedioxy-tetrathiafulvalene (referred to as "B") ($7.38 \times 10^{-4}$ mol/liter) and behenic acid.

Film deposition was undertaken at the pressure of 30 mN/m for EOET or 25 mN/m for BA by a vertical dipping method with a speed of 17 mm/min. During the process, each transferred layer was dried for 60 min (EOET) or 10 min (BO) under the air atmosphere. Y-type films were obtained. Each film was built up on a $CaF_2$ substrate for FT-IR study, and on a glass substrate on which a gold electrode was evaporated for the measurement of the electrical conductivity's.

(Π-A Isotherms Behavior)

Figure 4:
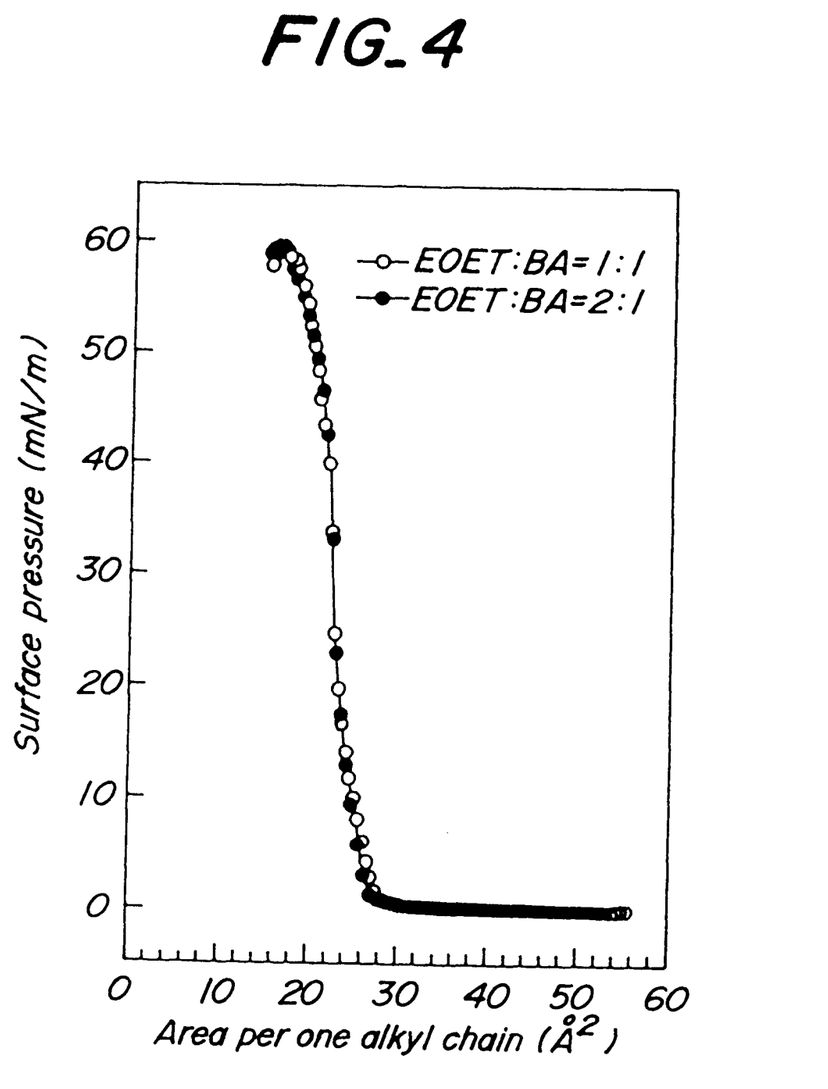
FIG. 4 is a graph showing Π-A isotherms of bimixture systems of EOET and behenic acid.

FIG. 4 exhibits Π-A isotherms for bimixture systems of EOET and behenic acid. In these isotherms, the horizontal axis shows area per one alkyl chain of behenic acid. The molar ratios of EOET to behenic acid were 1:1 and 2:1, respectively. Both molecular systems exhibited almost the same isotherm curves. It implies that the isotherms do not depend on EOET concentrations. Around the pressure of 30 mN/m, the molecules form a condensed layer in which the area per one alkyl chain is 22.4 $A^2$. This value is close to the occupied area per one molecule by the lateral packing of behenic acid molecules.

Such behavior of the isotherms can be well explained by the bilayer model. That is, each behenic acid and EOET form separated layers. In the model, the upper layer is made of behenic acid which brings about the lateral packing of this system and the lower layer is made of EOET (FIG. 3).

Therefore, it is considered that the above packing of the Langmuir-Blodgett films is determined by the lateral packing of the alkyl chains and the lower layer made of EOET is located under the upper layer made of behenic acid.

Figure 5:
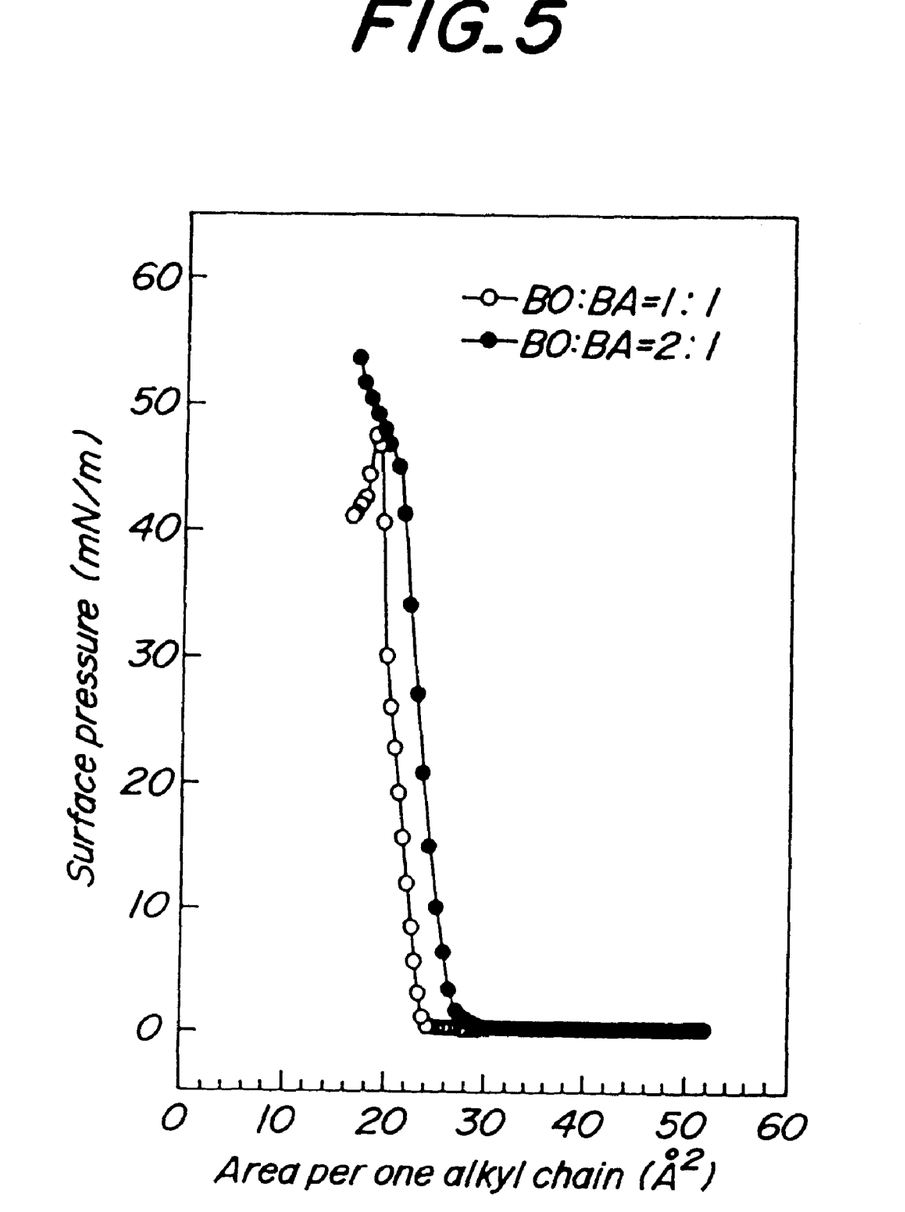
FIG. 5 is a graph showing Π-A isotherms of bimixture systems of BO and behenic acid.

FIG. 5 shows Π-A isoforms of bimixture systems of BO and behenic acid at 1:1 and 2:1 molar ratios. When the molar ratio of BO:behenic acid is 2:1, the bimixture system gives almost the same isotherm as that of EOET+behenic acid. On the other hand, when the molar ratio of BO:behenic acid is 1:1, the isotherm exhibited a slight shift to the smaller area (20.0 A$^2$ at 30 mN/m). However, the shift is relatively small and both 1:1 and 2:1 isotherm curves exhibit similar shape to that of pure behenic acid. Hence, we consider that the molecular organization of the BO+behenic acid bimixture systems is similar to that of EOET+behenic acid bimixture systems and the lateral packing of these systems is determined by alkyl chain packing of behenic acid.

(Experimental Results From FT-IR Spectroscopy)

Figure 6:
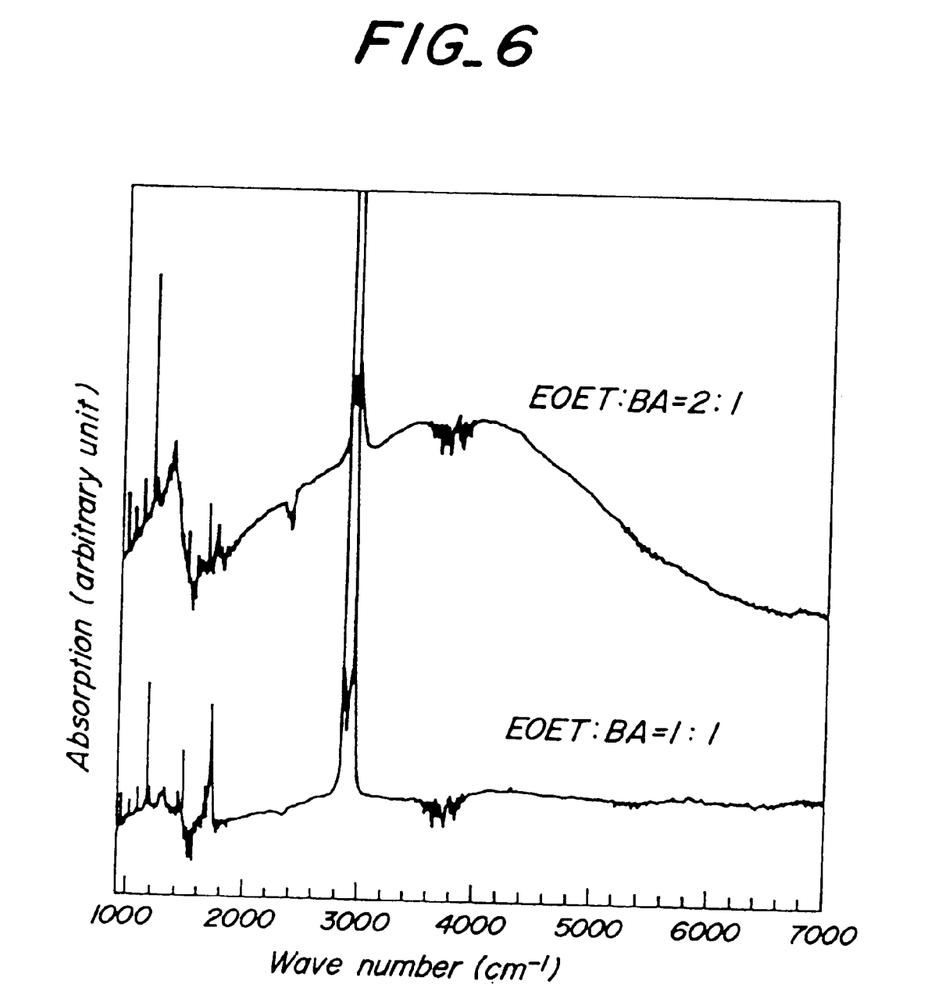
FIG. 6 shows FT-IR spectra of Langmuir-Blodgett films produced by the bimixture systems of EOET and behenic acid.

To further investigate the thus obtained mixed valence dimers, the inventors performed FT-IR absorption experiments on the Langmuir-Blodgett films with different molar ratios. The FT-IR absorption experiment was performed on each film in the frequency range of 900 to 7000 cm$^{-1}$. FIG. 6 exhibits the spectra of EOET+BA Langmuir-Blodgett films of 15 layers.

In the film obtained by applying the bimixture system of EOET and behenic acid at a molar ratio of 2:1, two characteristic bands induced from the mixed valence dimer state were observed. One band is vibronic mode band observed at about 1330 cm$^{-1}$ from electron-molecular vibration coupling. The other band is charge transfer band observed at about 3800 cm$^{-1}$.

In the film obtained by applying the system of EOET and behenic acid at a molar ratio of 1:1, the charge transfer band was not observed and a very weak vibronic absorption band was scarcely observed at 1303 cm$^{-1}$. Such disappearance of the charge transfer band and the vibronic band indicates that the mixed valence dimer was not formed in 1:1 film.

Figure 7:
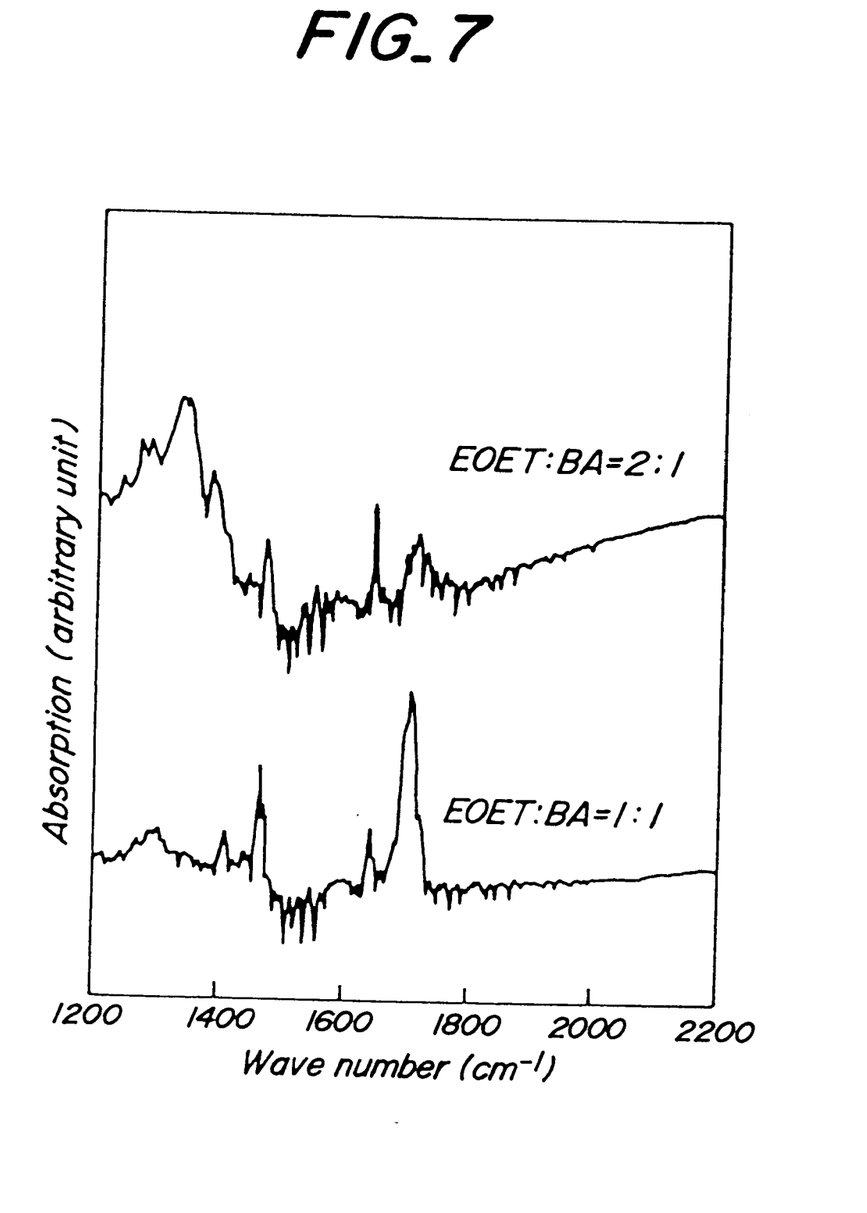
FIG. 7 shows the magnified spectra of parts of the spectra of FIG. 6, each spectrum magnifying a region with wave numbers of 1200 to 2200 $cm^{-1}$.

FIG. 7 shows the magnified spectra of a part of FIG. 6. The C=O absorption band of RCOOH was observed at 1708 cm$^{-1}$. In the spectra of 2:1, dramatic decrease in the intensity of C=O absorption was observed compared to the 1:1 spectra. It can be attributed to the conversion from the acid group into carboxylate.

Figure 8:
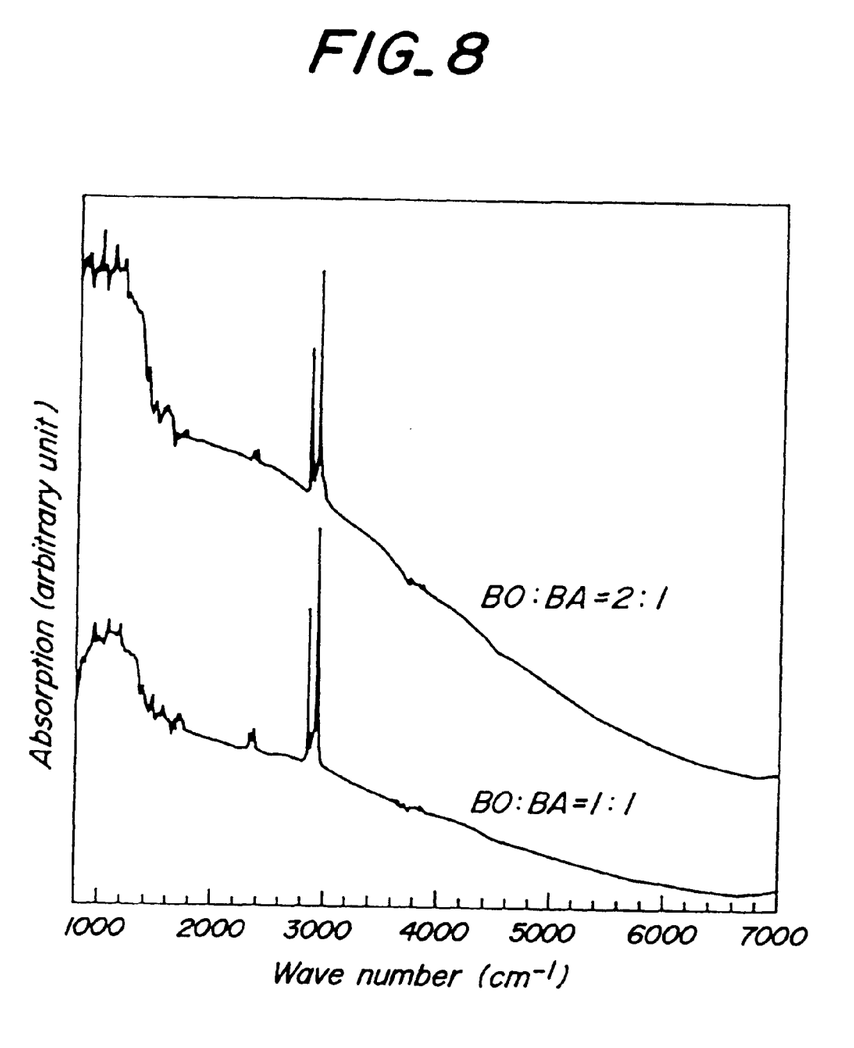
FIG. 8 shows FT-IR absorption spectra of Langmuir-Blodgett films produced by the mixture systems of BO and behenic acid.

FIG. 8 shows the absorption spectra of 9 layered BO+BA films. A broad charge transfer band was observed in both spectra of 1:1 and 2:1. Compared with the spectrum of EOET+BA, the charge transfer band of BO+BA shifted to lower frequency region with its center around 1600 cm$^{-1}$.

As understood from the above spectra, in both spectra of 1:1 and 2:1, the formation of the mixed valence dimers was observed. The bimixture systems of BO and BA differs from the systems of EOET and BA in this respect. In addition, the number of the dimers in the film increases with BO ratio within the region from 1:1 to 2:1 molar ratio.

(Measurement of Electrical Conductivities)

The electrical conductivities were measured by dc four-probe method. The maximum conductivity at a room temperature is 2.5 S/cm for EOET+behenic acid (2:1 molar ratio) and 40 S/cm for BO+behenic acid (2:1 molar ratio). These values were calculated by using the sample thicknesses estimated from the stacking periodicities of 56±1 angstroms (EOET+BA) and 66±1 angstroms (BO+BA) observed by X-ray diffraction experiment. The observed conductivities are remarkably high.

The origin of the significant difference of the conductivities between EOET and BO is not clear in the present stage. The investigation on lateral stacking of these donor molecules will provide a key to clarify the mechanism of the higher conductivity. One possible speculation is that BO molecules form short "C—H . . . O" intermolecular hydrogen bonding contacts in the film. Within this framework, such hydrogen bonding may play an important role to realize an optimized lateral stacking in BO molecules and bring about higher conductivities.

Experiment 2

Chloroform solution (7.38×10$^{-4}$ mol/liter) of bis-ethylenedioxy-tetrathiafulvalene and chloroform solution (8.22×10$^{-4}$ mol/liter) of behenic acid were prepared separately and mixed to provide mixed solution, in which a molar ratio of BO to behenic acid was adjusted to 2:1. Just after the mixing, the mixed solution was developed onto pure water maintained at 19° C. using a microsyringe.

On the water surface, the floating membrane was left in an uncompressed state for 10 minutes. The surface area of water surface, on which the mixed solution was developed, was decreased by using a movable barrier to compress the floating membrane. Film deposition was undertaken on a substrate at the pressure of 25 mN/m. The thus produced Langmuir-Blodgett film exhibited a high electrical conductivity even when the film-deposition was completed.

The Langmuir-Blodgett film with 7 layers was built up on a substrate on which a gold electrode was already evaporated. The thus produced film exhibited a direct current electrical conductivity of maximum 40 S/cm at a room temperature. Surprisingly, the inventors discovered that the film exhibited metallic conductivity property in low temperatures to as low as 14 K, as shown in a graph "A" in FIG. 9. Such extremely characteristic relationship between the electrical conductivities and temperatures has been beyond the utmost possibility of prior-type Langmuir-Blodgett films, as exemplified in graphs "B", "C" and "D".

On the other hand, 9 layers of the bimolecular system were deposited onto a CaF$_2$ substrate to produce a Langmuir-Blodgett film. In this film, a stacking periodicity of about 66 angstroms was observed by X-ray diffraction experiment. Therefore, the Langmuir-Blodgett film is not made of a plurality of types of clusters, but made of a single type stacking structure well ordered as shown in FIG. 3.

What is claimed is:

1. A Langmuir-Blodgett film formed by a combination of molecules of an amphiphilic organic carboxylic acid and a tetrathiafulvalene derivative, said amphiphilic organic carboxylic acid having not less than 18 carbon atoms and said tetrathiafulvalene derivative having no alkyl group with 8 to 24 carbon atoms.

2. The Langmuir-Blodgett film as claimed in claim 1, wherein said organic carboxylic acid comprises a long chain fatty acid having not less than 18 carbon atoms.

3. The Langmuir-Blodgett film as claimed in claim 2, wherein said long chain fatty acid comprises behenic acid.

4. The Langmuir-Blodgett film of claim 3, wherein said tetrathiafulvalene derivative comprises 4,5-ethylenedioxy-4',5'-ethylenedithio-tetrathiafulvalene.

5. The Langmuir-Blodgett film of claim 4, comprising mixed valence dimers formed by charge transfer between said organic carboxylic acid and said tetrathiafulvalene derivative.

6. The Langmuir-Blodgett film of claim 3, wherein said tetrathiafulvalene derivative comprises bis-ethylenedioxy-tetrathiafulvalene.

7. The Langmuir-Blodgett film of claim 6, comprising mixed valence dimers formed by charge transfer between said organic carboxylic acid and said tetrathiafulvalene derivative.

8. The Langmuir-Blodgett film of claim 3, comprising mixed valence dimers formed by charge transfer between said organic carboxylic acid and said tetrathiafulvalene derivative.

9. The Langmuir-Blodgett film as claimed in claim 1, wherein said tetrathiafulvalene derivative comprises 4,5-ethylenedioxy-4',5'-ethylenedithio-tetrathiafulvalene.

10. The Langmuir-Blodgett film as claimed in claim 1, wherein said tetrathiafulvalene derivative comprises bis-ethylenedioxy-tetrathiafulvalene.

11. The Langmuir-Blodgett film as claimed in claim 1, comprising one or more molecular layer made of said organic carboxylic acid and one or more molecular layer made of said tetrathiafulvalene derivative.

12. The Langmuir-Blodgett film as claimed in claim 11, wherein said molecular layer made of said organic carboxylic acid brings about lateral packing of the Langmuir-Blodgett film and said molecular layer made of said tetrathiafulvalene derivative provides electrical conductivity.

13. The Langmuir-Blodgett film as claimed in claim 11, wherein said Langmuir-Blodgett film is formed on a substrate and two molecular layers made of said organic carboxylic acid and two molecular layers made of said tetrathiafulvalene derivative are deposited alternately on the substrate.

14. The Langmuir-Blodgett film as claimed in claim 1, comprising mixed valence dimers formed by charge transfer between said organic carboxylic acid and said tetrathiafulvalene derivative.

* * * * *